(12) United States Patent  
Sakaguchi et al.

(10) Patent No.: US 7,780,504 B2
(45) Date of Patent: Aug. 24, 2010

(54) METHOD FOR MANUFACTURING DISK-SUBSTRATES FOR MAGNETIC RECORDING MEDIA, DISK-SUBSTRATES FOR MAGNETIC RECORDING MEDIA, METHOD FOR MANUFACTURING MAGNETIC RECORDING MEDIA, MAGNETIC RECORDING MEDIA, AND MAGNETIC RECORDING DEVICE

(75) Inventors: Shoji Sakaguchi, Matsumoto (JP); Hiroyuki Nakamura, Matsumoto (JP); Hideki Matsuo, Matsumoto (JP)

(73) Assignees: Fuji Electric Device Technology Co., Ltd., Tokyo (JP); Teijin Fibers Limited, Osaka-shi (JP)

( * ) Notice: Subject to any disclaimer, the term of this patent is extended or adjusted under 35 U.S.C. 154(b) by 168 days.

(21) Appl. No.: 12/004,505

(22) Filed: Dec. 21, 2007

(65) Prior Publication Data

US 2008/0188165 A1 Aug. 7, 2008

(30) Foreign Application Priority Data

Dec. 26, 2006 (JP) .............................. 2006-350557

(51) Int. Cl.
 *C04B 35/05* (2006.01)
 *B24B 7/00* (2006.01)
 *G11B 5/706* (2006.01)
(52) U.S. Cl. ............................ 451/63; 451/36; 451/39; 428/848.8
(58) Field of Classification Search .............. 428/848.8, 428/64.1, 65.3; 451/347, 36, 39, 63; 442/347, 442/363, 333, 334, 359, 380; 216/89, 52; 51/301, 293; 360/135; 524/35
See application file for complete search history.

(56) References Cited

U.S. PATENT DOCUMENTS 5,604,014 A 2/1997 Onodera (Continued)

FOREIGN PATENT DOCUMENTS

EP 1 757 406 A1 2/2007

(Continued)

OTHER PUBLICATIONS

Translation JP 2003-170348, Mimura et al (Jun. 17, 2003).*

(Continued)

*Primary Examiner*—Kevin M. Bernatz
*Assistant Examiner*—Louis Falasco
(74) *Attorney, Agent, or Firm*—Venable LLP; Michael A. Sartori; Steven J. Schwarz (57) ABSTRACT

A method for manufacturing a magnetic recording medium disk substrate is provided for achieving a magnetic disk having a suitable surface roughness, a high in-plane magnetic anisotropy and a high S/N. The manufacturing method has a texturing process wherein the magnetic recording medium disk substrate is rotated in the circumferential direction while a polishing tape is pressed against the rotating substrate. The polishing tape includes polyester fiber having a fiber diameter of 400 nm to 950 nm, on the surface coming into contact with the substrate. All the while, slurry including abrasive grains including a cluster diamond is supplied to the surfaces of the substrate. The present invention relates to a magnetic recording medium disk substrate produced by the manufacturing method; and a magnetic recording medium at least comprising a magnetic layer on the magnetic recording medium disk substrate and manufacturing method of the magnetic recording medium.

9 Claims, 6 Drawing Sheets

U.S. PATENT DOCUMENTS

| | | |
|---|---|---|
| 6,533,644 B1 | 3/2003 | Horie et al. |
| 6,565,618 B1 | 5/2003 | Ishizuka |
| 6,800,019 B2 | 10/2004 | Tanaka et al. |
| 6,974,368 B2 | 12/2005 | Horie et al. |
| 2002/0013984 A1* | 2/2002 | Makiyama et al. ......... 442/347 |
| 2002/0173257 A1* | 11/2002 | Kato et al. ................. 451/302 |
| 2003/0012983 A1* | 1/2003 | Ataka et al. ................ 428/836 |
| 2003/0013382 A1* | 1/2003 | Tanaka et al. ................ 451/36 |
| 2004/0063370 A1* | 4/2004 | Makiyama et al. ......... 442/363 |
| 2004/0112867 A1* | 6/2004 | Horie et al. .................. 216/89 |
| 2004/0241379 A1* | 12/2004 | Horie et al. ................ 428/65.3 |
| 2005/0086870 A1* | 4/2005 | Kumasaka .................. 51/307 |
| 2005/0119391 A1* | 6/2005 | Mason et al. ............... 524/445 |
| 2005/0248882 A1* | 11/2005 | Horie et al. ................ 360/135 |

FOREIGN PATENT DOCUMENTS

| | | |
|---|---|---|
| JP | H08-007264 | 1/1996 |
| JP | H11-138424 | 5/1999 |
| JP | H11-185248 A | 7/1999 |
| JP | H11-203667 A | 7/1999 |
| JP | 2000-001666 A | 1/2000 |
| JP | 2000-136376 | 5/2000 |
| JP | 2000-242921 A | 9/2000 |
| JP | 2002-030275 | 1/2002 |
| JP | 2002-079472 | 3/2002 |
| JP | 2002-172555 | 6/2002 |
| JP | 2003-170347 | 6/2003 |
| JP | 2003-170348 | 6/2003 |
| JP | 2004-171756 | 6/2004 |
| JP | 2004-178777 | 6/2004 |
| JP | 2004-259417 | 9/2004 |
| JP | 2005-131711 | 5/2005 |
| JP | 2005-329534 | 12/2005 |
| JP | 2007-308843 | 11/2007 |
| WO | WO 2006/006721 | 1/2006 |

OTHER PUBLICATIONS

Takahashi, K. et al., "Coercivity Orientation and Microstructure of CoCrPtTa Thin-Film Media."

Murao, R., et al., "Study of In-Plane Magnetic Anisotropy of Thin-Film Media."

* cited by examiner

METHOD FOR MANUFACTURING DISK-SUBSTRATES FOR MAGNETIC RECORDING MEDIA, DISK-SUBSTRATES FOR MAGNETIC RECORDING MEDIA, METHOD FOR MANUFACTURING MAGNETIC RECORDING MEDIA, MAGNETIC RECORDING MEDIA, AND MAGNETIC RECORDING DEVICE

This application claims the benefit of Japanese Patent Application No. 2006-350557, filed Dec. 26, 2006 which is hereby incorporated by reference herein in its entirety.

BACKGROUND OF THE INVENTION

1. Field of the Invention

The present invention relates to a method of manufacturing a disk-substrate used for a magnetic recording medium, the disk-substrate for the magnetic recording media, a method of manufacturing the magnetic recording media, the magnetic recording media, and a magnetic recording device.

2. Description of the Related Art

Recently, a hard disk drive (HDD) is often used as a storage device in a variety of devices such as personal computers and digital home appliances.

A HDD essentially comprises a disk-shaped magnetic recording media (hereinafter referred to as a "magnetic disk") which is called a hard disk (HD), a spindle motor for rotating a magnetic recording media, an arm having a magnetic head attached thereto, and a servomechanism controlling the arm. The magnetic head is used to write magnetic information on the magnetic disk and read the magnetic information from the magnetic disk.

Recording techniques used for the HDD include longitudinal magnetic recording and perpendicular magnetic recording. The longitudinal magnetic recording aligns data bits horizontally in the circumferential direction on the surface of the magnetic recording medium disk. In contrast, the perpendicular magnetic recording aligns data bits perpendicularly to the surface of the magnetic recording medium disk. Recently, in response to the request to increase the recording density, the perpendicular magnetic recording is coming into practical use. However, the longitudinal magnetic recording, which has conventionally been in practical use and has a proven track record over the years, is still in vogue.

Currently, in the process of fabricating a magnetic disk generally used for a longitudinal magnetic recording HDD, onto a non-magnetic disk substrate are deposited a non-magnetic metal underlayer formed of a Cr film and the like, a magnetic recording layer formed of a Co alloy magnetic film and the like, a protective layer formed of an amorphous carbon film and the like, and a lubricant layer formed of a liquid lubricant. The non-magnetic metal underlayer, the magnetic recording layer and the protective layer can be formed by sputtering and the lubricant layer can be formed by coating. Each of these layers may comprise a plurality of layers as necessary. A variety of layers may be interposed between the above layers for various purposes.

In the HDD, when the magnetic information is read/written, the magnetic head is out of contact with the magnetic disk. Because of the rotation of the magnetic disk, the magnetic head is slightly flown.

If the surface of the magnetic disk is completely flat, the magnetic head cannot be stably flown even when the magnetic disk is rotated, due to, for example, the adhesion between the magnetic disk and the magnetic head. Typically, asperities are uniformly distributed on the surface of the magnetic disk for the purpose of achieving the flying stability of the magnetic head.

In a typical method of providing asperities on the surface of the magnetic disk, asperities are first formed on the surface of the disk substrate. Then, the non-magnetic metal underlayer, magnetic recording layer, protective layer, lubricant layer and the like are deposited on the disk substrate with the asperities. As a result, asperities corresponding to the asperities on the disk substrate are provided on the magnetic disk surface.

If the asperities on the magnetic disk surface have a large size, this causes an increase in distance between the magnetic disk and the magnetic head (flying height). In recent years, with an increase in the recording density of a HDD, the flying stability thus required becomes shorter and shorter. To meet the requirement of shorter flying stability, the magnetic disk surface is required to have uniform and nanometer scale asperities.

A method called texturing is known as a typical process for providing asperities on the disk substrate surface. In texturing, typically, a polishing tape is sent bit by bit to and pressed against the surface of the disk substrate which is rotated in the circumferential direction, to form approximately concentric line traces.

Ways of accomplishing such texturing include "fixed abrasive" texturing that uses a polishing tape with abrasive grain existing on its surface, and "free abrasive" texturing that uses a polishing tape without abrasive particles. In the case of using the polishing tape without abrasive particles, the texturing is performed while slurry including abrasive grain is applied as free abrasive grain.

In the "free abrasive" texturing, the processing speed of texturing, the precision of texturing, the shape of asperities thus formed, the line width of the line trace, the surface roughness, the uniformity of the asperities, and the like are greatly varied depending upon the type of polishing tape or slurry being used. Also, since such polishing tapes and slurry are consumable articles, the durability is of importance in terms of costs for practical use. In consequence, a choice and a combination of the polishing tapes and slurry are of critical importance.

Various types of polishing tapes used in the "free abrasive" texturing are proposed. Among others, recently, attempt has been made to reduce the diameter of fiber used in the polishing tape, in order to achieve minute asperities. The use of fiber having a fiber diameter of micrometer order, called microfiber, and the use of fiber having an ultrafine fiber diameter of nanometer order, called nanofiber, are proposed. For example, Japanese Patent Application Laid-Open No. 2002-79472 discloses an abrasive sheet for texturing a magnetic recording medium, which comprises ultrafine fiber having a fineness of 0.03 dtex (decidex) or less. Fineness (tex) represents fiber diameter. 1 tex is 1 g/1000 m length. Fineness is a function of a specific gravity and the diameter when the fiber is perfectly circular in cross section. Specifically, 0.03 dtex represents a diameter of 1.8 µm in the case of Nylon 6 having a specific gravity of 1.14, and represents a diameter of 1.7 µm in the case of PET having a specific gravity of 1.39.

Japanese Patent Application Laid-Open No. 2002-172555 discloses abrasive base fabric including microfiber with an average diameter of from 0.3 µm to 10 µm located in its central portion and including microfiber with an average diameter of from 0.05 µm to 1 µm located in its periphery portion, and describes that the base fabric is suitable for use in the texturing carried out in the process of manufacturing a magnetic recording substrate for a hard disk or the like.

Japanese Patent Application Laid-Opens No. 2003-170347 and No. 2003-170348 disclose abrasive base fabric including microfiber with an average diameter of 2 μm or less and abrasive base fabric including microfiber with an average diameter of from 0.05 μm to 2 μm, and describes that the base fabric is suitable for use in the texturing carried out in the process of manufacturing a magnetic recording substrate for a hard disk or the like.

Japanese Patent Application Laid-Open No. 2005-329534 discloses abrasive fabric having nanofiber with a number averaged monofilament fineness ranging from $1 \times 10^{-8}$ dtex to $4 \times 10^{-4}$ dtex, and describes that the abrasive fabric is used in texturing a substrate provided for manufacturing a magnetic recording medium. A monofilament fineness of from $1 \times 10^{-8}$ dtex to $4 \times 10^{-4}$ dtex represents a monofilament diameter of from 1 nm to 200 nm in the case of Nylon 6 (specific gravity 1.14 g/cm$^3$).

The slurry used in the "free abrasive" texturing comprises abrasive of diamond abrasive grain, alumina abrasive grain or the like dispersed in a solvent such as water. As necessary, an additive such as a dispersant or a surfactant may be added to the slurry. The material, size and shape of the abrasive greatly affect the texturing process time and a texture shape. Various types of grains are proposed as a diamond abrasive grain generally used in the texturing. For example, Japanese Patent Application Laid-Open No. H08-7264 discloses a texturing process in grinding by monocrystalline diamond slurry having a particle diameter of 3 μm or less. Japanese Patent Application Laid-Open No. H11-138424 discloses a slurry fluid for texturing the surface of a magnetic hard disk substrate, which contains polycrystalline diamond fine-powder with an average particle diameter $d_{50}$ of from 0.05 μm to 5 μm. Japanese Patent Application Laid-Open No. 2002-030275 discloses a texturing fluid for texturing a magnetic disk substrate. The texturing fluid includes agglomerated polycrystalline diamond particles of an average particle diameter of from 0.01 μm to 2 μm. Each of the agglomerated polycrystal diamond particles consists of polycrystalline diamond particles of an average particle diameter of from 1 nm to 20 nm.

Japanese Patent Application Laid-Opens No. 2004-178777 and No. 2004-259417 disclose abrasive slurry used for texturing the surface of a magnetic hard disk substrate. The abrasive slurry includes monocrystalline diamond particles, polycrystalline diamond particles or cluster particles comprising the monocrystalline and polycrystalline diamond particles, these particles having a particle diameter ranging from 1 nm to 10 nm or from 1 nm to 50 nm. Japanese Patent Application Laid-Open No. 2000-136376 discloses abrasive particles which are non-cohesive aggregates of fine monocrystalline particles of diamond which have an average particle diameter of 5 μm or less. The surface of the diamond particles is covered with non-diamond carbon. The abrasive particles are used for texturing a nickel-coated aluminum substrate which is used for producing a hard disk. Japanese Patent Application Laid-Open No. 2005-131711 discloses diamond abrasive particles made of artificial diamond produced through an impact method, in which the average diameter of the secondary particles ranges from 30 nm to 500 nm and the diameter of the primary particles is 20 nm or less. The abrasive particles are suitable for use in abrading or texturing a magnetic hard disk substrate. Also, International Publication WO2006/006721 discloses a composition for texturing including nano-diamond crystal cluster produced by detonation of an oxygen-deficient explosive, and describes that the composition is used for texturing an underlayer of an aluminum-made magnetic disk or the surface of a glass-made magnetic disk.

In addition to producing uniform asperities on the surface of a magnetic disk for the purpose of stably flying the magnetic head, the texturing also has a role in eliminating, from the disk substrate surface, scratches which lead to a magnetic-recording error and abnormal projections with which the magnetic head may come into collision to cause head crash, as described in the aforementioned documents and the like. In particular, in a longitudinal magnetic recording medium, the texturing has a role in unidirectionally aligning the crystal orientations of the particles included in the non-magnetic metal underlayer and the magnetic recording layer so as to contribute to the improvement of the recording density.

One of effective ways to improve the S/N ratio of the longitudinal magnetic recording medium is an increase in anisotropy between the magnetic properties in the circumferential direction and the radial direction (in particular, an OR–Mr·t ratio between residual magnetization-thickness products (Mr·t) in the circumferential direction and the radial direction). It is known that the texturing which forms grooves in the circumferential direction is useful for an increase in in-plane magnetic anisotropy.

There are some examination cases and are proposed some theories, as to the mechanism of an increase in in-plane magnetic anisotropy by the texturing.

For example, "Coercivity Orientation and Microstructure of CoCrPtTa Thin-Film Magnetic Recording Media" by Katsunori Takahashi et al. (Journal of Magnetics Society of Japan, 2000, vol. 24, pp 283-286), and "Study of In-Plane Magnetic Anisotropy of Thin-Film Media" by Reiko Murao et al. (Journal of Magnetics Society of Japan, 2001, vol. 25, pp 615-618), study magnetic recording media having a Cr alloy underlayer film, a CoCrPtTa alloy magnetic film, and a DLC protective film sequentially deposited, by DC magnetron sputtering, on the NiP/Al—Mg substrate which has been textured. According to those literatures, when the diameter of a crystal particle is smaller than the half width of a fine texture groove, the texture shape effects result in the occurrence of stress anisotropy in the circumferential direction and the radial direction on the substrate surface. In turn, the stress anisotropy produces in-plane distortion of the crystal lattice of the Cr underlayer film. When the Cr (110) interplanar spacing in the circumferential direction becomes smaller, an axis of easy magnetization of CoCrPtTa is preferentially oriented in the circumferential direction, resulting in an increase in in-plane magnetic anisotropy.

SUMMARY OF THE INVENTION

The mechanism to increase the in-plane magnetic anisotropy by the texturing has not been sufficiently elucidated, although it is thought to be associated with crystalline microstructure. In structure of various magnetic recording media, there is numerous uncertainty, for example, as to what texture shape is required for an increase in in-plane magnetic anisotropy.

As described above, the texturing has several effective advantages. In actual use, these effective advantages are required to be taken in a balanced manner. For example, even when the in-plane magnetic anisotropy is high, if the surface roughness is too high or too low, desired characteristics of HDD cannot be provided.

Thus, there have not been revealed a method and conditions for bringing the several effective advantages of the texturing into balance to obtain a greater effective advantage, yet. The situation is in the process of studying numerous texturing methods and various texturing conditions by trial and error. In particular, a polishing tape and abrasive grain used in the texturing greatly affect a very fine texture shape. For this reason, the determination of a selection and a combination of the polishing tape and the abrasive grain for use is very important. However, a criterion of selection criteria has not been revealed yet.

It is a principal object of the present invention to provide a magnetic disk having an appropriate surface roughness, a high in-plane magnetic anisotropy, and a high S/N ratio, and to provide a method for fabricating a disk substrate for such a magnetic recording medium.

In the light of the foregoing problems, the inventors have studied a polishing tape and abrasive grain used in texturing, and reached the present invention by finding a method of texturing a magnetic recording medium substrate which is effective in obtaining a magnetic disk optimal for manufacturing an HDD having satisfactory flying stability and a high recoding density.

Specifically, a first aspect of the present invention provides a method for manufacturing a magnetic recording medium disk substrate comprising a step of texturing. In the step of texturing, while the magnetic recording medium disk substrate is rotated in a circumferential direction by rotating means, pressing means is operated to press a polishing tape against the rotating disk substrate, the polishing tape including polyester fiber having a fiber diameter of 400 nm or more and 950 nm or less, on at least a surface coming into contact with the disk substrate, and all the while, slurry supplying means supplies slurry containing abrasive grain including a cluster diamond to the surfaces of the disk substrate.

A second aspect of the present invention provides a magnetic recording medium disk substrate manufactured by the method comprising a step of texturing, the step of texturing is conducted by pressing a polishing tape by a pressing means against the disk substrate rotated in a circumferential direction by a rotating means, while supplying a slurry containing abrasive grains including cluster diamond to a surface of the disk substrate, wherein the polishing tape includes polyester fiber having a fiber diameter of 400 nm or more and 950 nm or less, on at least a surface which contacts with the disk substrate.

A third aspect of the present invention provides a method for manufacturing a magnetic recording medium comprising the step of: manufacturing a magnetic recording medium disk substrate according to the method of the first aspect; and forming at least a magnetic layer onto the magnetic recording medium disk substrate.

A fourth aspect of the present invention provides a magnetic recording medium comprising the magnetic recording medium disk substrate according to the second aspect, and at least a magnetic layer onto the magnetic recording medium disk substrate.

A fifth aspect of the present invention provides a magnetic recording device comprising at least the magnetic recording medium according to the fourth aspect, a spindle motor rotating the magnetic recording medium, an arm attached a magnetic head thereto, and a servomechanism for controlling the arm.

According to the present invention, the magnetic disk thus provided has a small surface roughness Ra of the disk substrate, and a large orientation ratio of residual magnetization-thickness product (OR–Mr·t), which makes it possible to achieve a magnetic disk device capable of achieving a high recording density.

Further features of the present invention will become apparent from the following description of exemplary embodiments (with reference to the attached drawings).

DESCRIPTION OF THE EMBODIMENTS

Figure 1:
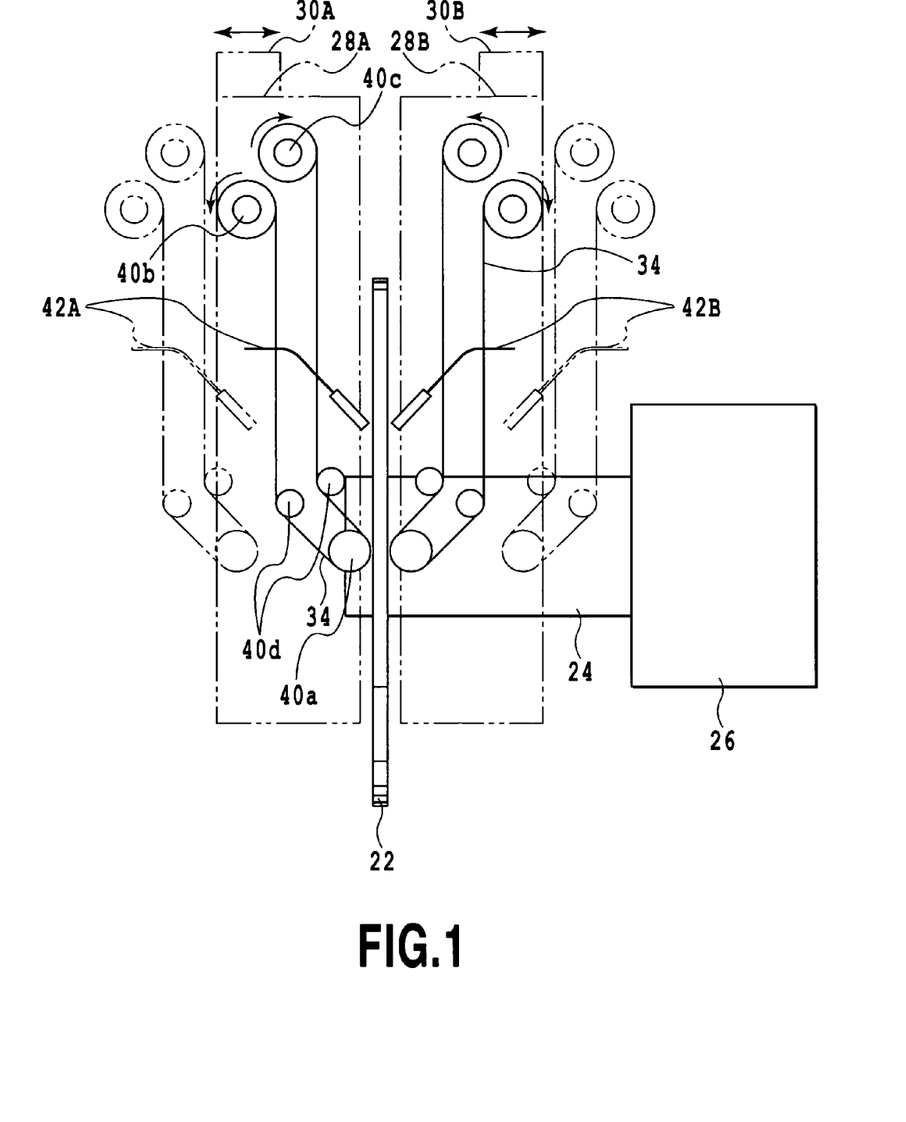
FIG. 1 is a schematic view showing an example of a texturing apparatus according to the present invention when viewed from the peripheral face of the disk substrate.
Figure 2:
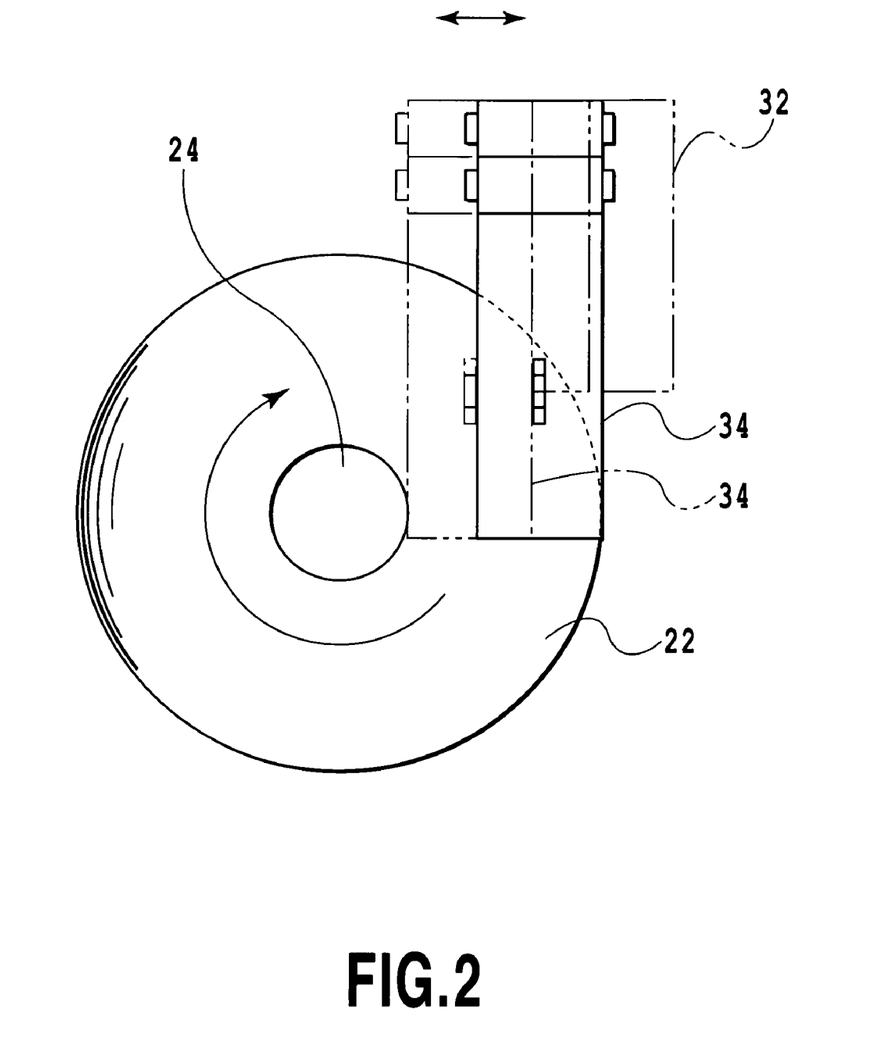
FIG. 2 is a schematic view showing an example of a texturing apparatus according to the present invention when viewed from the surface of the disk substrate.

An embodiment according to the present invention will be described below. FIG. 1 and FIG. 2 are schematic views of an example of the texturing apparatus according to the present invention. FIG. 1 is a schematic view when viewed from the peripheral side of the disk substrate, and FIG. 2 is a schematic view when viewed from the surface of the disk substrate.

The texturing apparatus comprises a chucking mechanism 24 removably holding a disk substrate 22, a rotation drive 26 rotating the chucking mechanism 24 with the disk 22 being coupled to the chucking mechanism 24, tape-polishing mechanisms 28A and 28B for pressing the respective polishing tapes 34 against the two surfaces of the disk substrate 22 for polishing, moving mechanisms 30A and 30B for the tape-polishing mechanism for respectively moving the tape-polishing mechanisms 28A and 28B toward/away from each other along the axis of the chucking mechanism 24, an oscillation device 32 moving the tape-polishing mechanisms 28A and 28B in the radial direction of the substrate 22, and nozzles 42A and 42B disposed as slurry supplying means in the respective tape-polishing mechanisms 28A and 28B for supplying a slurry fluid to the two surfaces of the disk substrate 22.

The disk substrate 22 is for a magnetic recording medium and is formed in a circular plate shape with the central hole. The disk substrate 22 may have various sizes. A disk substrate typically used has a nominal diameter of 0.85 inches, 1 inches, 1.3 inches, 1.8 inches, 2.5 inches, 3.3 inches, 3.5 inches or 5 inches, a thickness ranging from 0.1 mm to 3 mm, and a central hole having a diameter of approximately from 5 mm to 50 mm. It should be noted that, for example, a nominal 3.5-inch disk commonly has an outer diameter of 95 mm. The inch notation does not always show an exact outer diameter. Glass, aluminum, silicon, ceramic or the like may be used as materials of the substrate. Typically, aluminum is used for a substrate having a diameter of 2.5 inches or larger and glass is used for a substrate having a diameter of 2.5 inches or less. An Al—Mg alloy is preferably used for the aluminum substrate. Aluminosilicate glass is used for the glass substrate. In the present invention, it is preferable to use a disk substrate having a surface on which an electroless plated nickel-phosphorus film is deposited, and more preferably an aluminum substrate with an electroless plated nickel-phosphorus film deposited thereon.

The chucking mechanism 24 has functions of permitting the loading/unloading of the disk substrate 22 and of holding the disk substrate 22 in the upright position during the texturing process.

The rotation drive 26 may be a drive motor controlled by a control unit described later, for example. In the texturing process, the rotation drive 26 is controlled to rotate the chucking mechanism 24 connected thereto and the disk substrate 22 held by the chucking mechanism 24.

The tape-polishing mechanisms 28A and 28B, which are disposed in opposed positions across the disk substrate 22, have an identical structure. Therefore, only the tape-polishing mechanism 28A is explained and the description of the tape-polishing mechanism 28B is omitted.

The tape-polishing mechanism 28A comprises: a feed roll 40c feeding the polishing tape 34 described later; a take-up roll 40b taking up the polishing tape 34; a pressing roll 40a pressing a portion of the continuously fed polishing tape 34 against a surface of the substrate 22 which is to be processed; and tension rolls 40d respectively applying an initial tension to a routing portion of the polishing tape 34 located between the pressing roll 40a and the feed roll 40c, and a routing portion between the pressing roll 40a and the take-up roll 40b.

The take-up roll 40b is connected to the output shaft of the drive motor (not shown). Thus, by actuating the drive motor, the polishing tape 34 fed from the feed roll 40c moves in the direction of the arrow in FIG. 1, passes by the pressing roll 40a, and then is continuously taken up at a predetermined speed by the take-up roll 40b. The travel speed of the polishing tape ranges approximately from 10 mm/min to 200 mm/min.

As a result, the surface of the disk substrate 22 always contacts with a new portion of the polishing tape 34 continuously fed and moved along the outer surface of the pressing roll 40a on the way. The pressing roll 40a used is ordinarily made of rubber, and has a hardness of approximately from 10 duro to 100 duro.

The nozzles 42A and 42B supplying the slurry fluid are arranged in the tape-polishing mechanisms 28A and 28B such that the leading ends of the respective nozzles 42A and 42B respectively face the two surfaces of the disk substrate 22 held by the chucking mechanism 24.

Hence, the nozzles 42A and 42B are placed in opposed positions across the disk substrate 22. The other end of each of the nozzles 42A and 42B is connected through a supply pump to a slurry fluid tank (not shown) in which the slurry fluid is stored. The feed rate of the slurry fluid ranges approximately from 1 ml/min. to 100 ml/min.

The nozzles 42A and 42B are respectively moved together with the tape-polishing mechanisms 28A and 28B by the tape-polishing mechanism moving mechanisms 30A and 30B, and are reciprocated by the oscillation device 32. The period of the reciprocating motion is called oscillation. The oscillation ranges approximately from 1 Hz to 10 Hz, and the width of the reciprocating motion ranges approximately from 0.1 mm to 5 mm.

The polishing tape 34 used in the present invention is a polishing tape including polyester-made fiber having a fiber diameter of 400 nm or more and 950 nm or less, preferably, 500 nm or more and 950 nm or less. When the fiber has irregular or variant cross-section other than circular cross-section, the diameter of such fiber is determined by an equivalent diameter of a fiber having a perfect circle cross-section or an equivalent long-axis diameter of a fiber having an ellipse cross-section. The fiber diameter can be determined by observation with a transmission electron microscope. If the fiber diameter is widely distributed, a plurality of fiber diameters selected appropriately are averaged.

The fiber used in the present invention may be a monofilament, or alternatively, a multifilament made by twisting a plurality of monofilaments together. The polishing tape 34 may be formed of polyester-made fiber alone having a fiber diameter of 400 nm or more and 950 nm or less. Alternatively, the polishing tape may be formed of commingled yarn made from the polyester-made fiber of the above fiber diameter and other fibers, in order to increase the thickness of the tape. For example, in terms of an improvement in rigidity and tear strength of fabric, it is preferable to use commingled yarns made from polyester multifilament having a fineness of the monofilament ranges from 1.0 dtex to 8.0 dtex and other fibers. The polishing tape 34 may be woven fabric or nonwoven fabric. Such fabric may be buffed. Buffing is the process of rubbing the fabric with, for example, sandpaper of #100 to #800 or the like for raising the fibers.

Preferable examples of polyester include polyethylene terephthalate (PET), polytrimethylene terephthalate (PTT), polybutylene terephthalate (PBT), polylactic acid, or polyesters obtained by copolymerizing these components with a third component.

A preferable thickness of the polishing tape ranges approximately from 0.1 mm to 3 mm. When the thickness of the polishing tape is less than 0.1 mm, the tape strength is apt to be insufficient. On the other hand, when it exceeds 3 mm, the operability may decrease. The width of the polishing tape ranges approximately from 1 cm to 10 cm, which depends on the size of the disk substrate. A preferable width of the polishing tape is approximately equal to the outer radius of the disk substrate. The length of the polishing tape is arbitrarily determined. Such a polishing tape can be fabricated by a well-known manufacturing method.

The slurry fluid used in the present invention consists essentially of abrasive grains including cluster diamond and a dispersing medium.

The cluster diamond comprises secondary particles in cluster form to which a plurality of primary single-crystal particles, called nanodiamond, are bonded. A preferable average particle diameter of the secondary particles of the cluster diamond is 50 nm or more and 300 nm or less. A preferable average particle diameter of the primary particles is 1 nm or more and 30 nm or less.

An average particle diameter of the cluster diamond can be measured by being observed with the transmission electron microscope. When the average particle diameter is widely distributed, a plurality of particle diameters selected appropriately are averaged to obtain an average particle diameter. In the present invention, for obtaining the average particle diameter of the secondary particles, five secondary particles are selected, and the external shape of each of selected secondary particles is presumed as a perfect circle or an ellipse. When presumed as a perfect circle, the diameter of the circle is measured, and when presumed as an ellipse, the long-axis diameter of the ellipse is measured. Then, the average of the five particle diameters is calculated. For the average particle diameter of the primary particles, five primary particles having external shapes which can be relatively easily observed are selected and the external shape of each of selected primary particles is presumed as a perfect circle or an ellipse. When presumed as a perfect circle, the diameter of the circle is measured, and when presumed as an ellipse, the long-axis diameter of the ellipse is measured. Then, the average of the five particle diameters is calculated.

Such cluster diamond can be fabricated by well-known detonation of an oxygen-deficient explosive, and is available from a producer such as Saint-Gobain Ceramic Materials K.K.

Water or a solution including an additive dissolved in water is used as the dispersing medium. Examples of the additive include well-known surface active agents or the like, for the purposes of improving the dispersibility of the abrasive grains, of improving the lubricity in the texturing process.

The content of abrasive grains in the slurry fluid is approximately from 0.001% to 5% by weight. The content of the additive in the slurry fluid is approximately from 0.1% to 10% by weight.

For texturing a disk substrate, the disk substrate is loaded on the aforementioned texturing apparatus. While the disk substrate is rotated, the slurry fluid is fed to the surfaces of the disk substrate and the polishing tape is pressed against the disk substrate. At this point, the abrasive grains are held on the polishing tape, and the disk substrate is polished mainly by the held abrasive grains. Then, the rotation of the disk substrate and the reciprocating motion of the polishing tape create numerous grooves in approximately circular shape almost on the full surface of the disk substrate. The numerous grooves are called texture traces.

The rotational speed of the disk substrate when the polishing tape is pressed against it is preferably from 10 rpm to 1000 rpm. The thrusting pressure of the polishing tape is preferably from 0.1 kgf/cm² (9.8 kPa) to 10 kgf/cm² (0.98 MPa). The feeding rate (travel speed) of the polishing tape is preferably from 10 mm/min to 200 mm/min. The rotational speed of the disk substrate when the polishing tape is pressed, the thrusting pressure of the polishing tape and the travel speed of the polishing tape can be suitably selected, depending on the characteristics of the polishing tape used. In other words, the rotational speed of the disk substrate and the thrusting pressure and the travel speed of the polishing tape may vary within the above ranges so as to achieve the optimal processing conditions.

EXAMPLES

Examples of the present invention will be described below, however, the present invention is not limited to the following examples.

<Cover Factor>

A cover factor was calculated from the following equation.

$$CF=(DWp/1.1)^{1/2} \times MWp+(DWf/1.1)^{1/2} \times MWf$$

Where, DWp is total fineness of warps (dtex), MWp is fibrous density of warps (number/2.54 cm), DWf is total fineness of wefts, and MWf is fibrous density of wefts (number/2.54 cm).

<Thickness of Fabric>

The thickness of the fabric was measured according to JIS L 1096 8.5.

<Tear Strength of Fabric>

The tear strength of the fabric was measured according to JIS L 1096 8.15.5.

<Shrinkage in Boiled Water>

The shrinkage in boiled water was measured according to JIS 1013 8.18.

<Evaluation of Disk Substrate>

A measurement area of 10 µm by 10 µm of the surface of each of the disk substrates having texture traces which have been fabricated in Examples and Comparative Examples described below was observed with an atomic force microscope (AFM) to obtain a sectional shape in the radial direction. An average surface roughness Ra is determined from the sectional shape, according to JIS B0601-1982.

<Evaluation of Magnetic Recording Medium>

Figure 4:
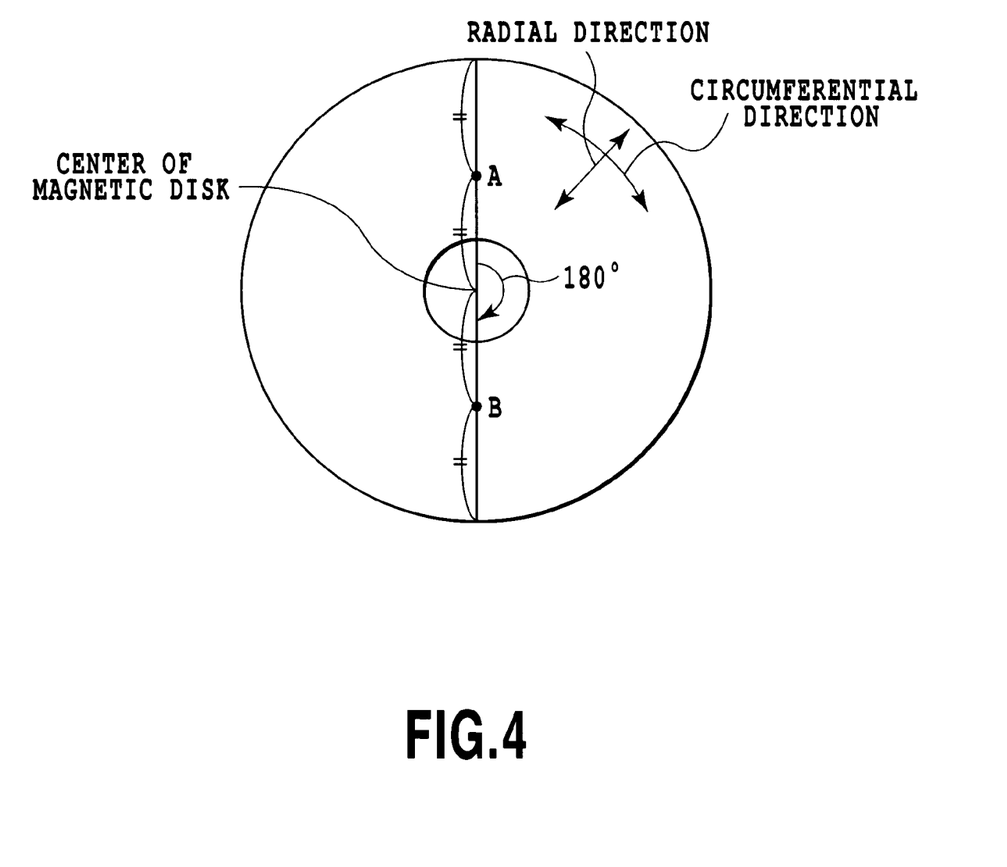
FIG. 4 is a schematic diagram showing the surface of the magnetic disk.

The magnetic recording media produced in Examples and Comparative Examples were evaluated by means of a magnetic measuring instrument, called ORM instruments (Orientation Ratio Magnetometer produced by Innovative Instrumentation), to measure OR–Mr·t. OR–Mr·t in the present invention is determined by averaging the measurements at point A and point B which are midpoints (between the center of the magnetic disk and the peripheral edge) in the radial direction of the magnetic disk in FIG. 4. Point A and point B are positioned symmetrically about the center of the magnetic disk. In the case of the 95 mm diameter magnetic disk of Examples and Comparative Examples, the radius is about 42 mm, and each of the points A and B is positioned at a distance of 21 mm from the center of the magnetic disk. Mr·t in the circumferential direction and Mr·t in the radial direction are measured at point A and point B. A ratio between the Mr·t value in the circumferential direction and the Mr·t value in the radial direction (circumferential Mr·t/radial Mr·t) is calculated. Then, an average value of the calculated values at point A and point B is defined as OR–Mr·t.

Example 1

Polyethylene terephthalate is used for an island component. For a sea component, polyethylene terephthalate obtained by copolymerizing 9 mol % of sodium salt of 5-sulfoisophthalic acid and 3 wt % of polyethylene glycol having a number-average molecular weight of 4000 is used. Island-sea type composite undrawn fiber (sea:island=30:70, the number of islands=836) was formed by melt spinning at a spinning temperature of 280° C. and at a spinning rate of 1500 m/min., and then was temporarily wound. The obtained undrawn yarn was drawn by a roller at a drawing temperature of 80° C. in a draw ratio of 2.5, and then thermally set at 150° C. before being wound. The obtained island-sea type composite drawn yarn is 56 dtex/10 fil (boiling water shrinkage of 8.5%). As a result of observations of fiber cross-section with the transmission electron microscope (TEM), the island has a round shape and the diameter of the island is 700 nm.

Figure 3:
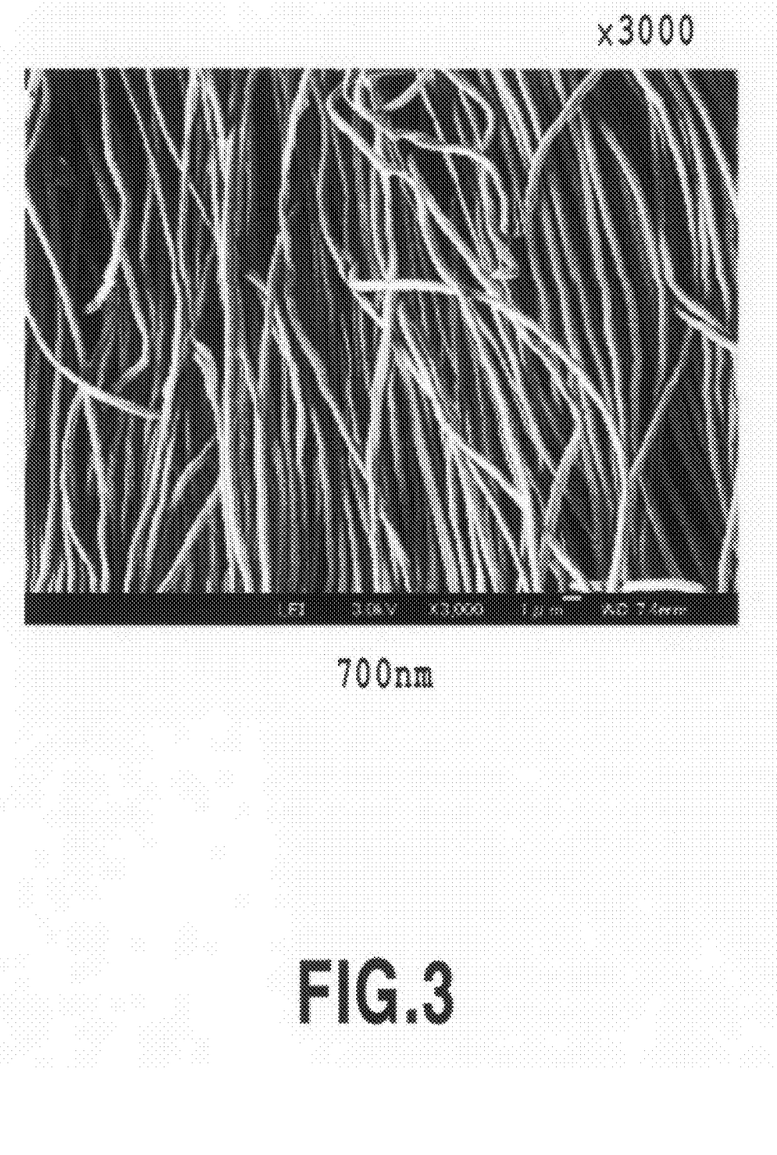
FIG. 3 is a photograph showing the surface of a polishing tape in embodiment example 1, which is observed with a transmission electron microscope.

Next, the above-described drawn yarn was interlaced with multifilament made of ordinary polyethylene terephthalate (33 dtex/12 fil, fineness of monofilament 2.75 dtex, boiling water shrinkage 39.0%, produced by Teijin fiber corporation) to form commingled yarn. The commingled yarn was twisted at 300 turn/m (in the S direction). Then, woven gray goods of a 5-shaft satin weave at a warp density of 215 yarns/2.54 cm and a weft density of 105 yarns/2.54 cm were produced from the twisted yarn which is used as both of the warps and wefts, by means of an ordinary weaving method. Then, the woven gray goods were subjected to heat and moisture treatment at 60° C., and then were reduced in weight by 20% at 60° C. in a 3.5% NaOH solution (weight-loss with alkali), in order to remove the sea component from the sea-island type composite drawn yarn. After the weight-loss with alkali, the island-sea type composite fiber was changed to multifilament formed of polyethylene terephthalate and having a monofilament diameter of 700 nm. After that, a conventional heat and moisture treatment and a conventional heat and dry treatment were performed, and then, the surface of the fabric was buffed by means of #400 sandpaper. The obtained fabric has a cover factor (CF) of 3272, a thickness of 0.202 mm, and tear strengths of 14.7 N in the warp direction and of 6.4 N in the weft direction. Then, the fabric was cut into a tape shape having a width of 4 cm to obtain a polishing tape. FIG. 3 shows the surface of the polishing tape observed with the transmission electron microscope.

The surface of an aluminum-5 wt % magnesium alloy substrate (the diameter of 95 mm, the thickness of 1.27 mm, the center hole having a diameter of 25 mm) was electroless plated with nickel-phosphorus to obtain a plated layer having a thickness of 8 μm, then was polished to obtain a disk substrate having mirror finished surfaces. The obtained disk substrate was loaded in the texturing apparatus shown in FIG. 1 and FIG. 2. The surface of the disk substrate was textured in the following conditions with the polishing tape obtained in the foregoing and a slurry fluid as described below. Then, the surface of the disk substrate was washed, resulting in the production of a disk substrate having approximately circular-shaped texture traces.

A slurry fluid was obtained by ultrasonically dispersing cluster diamond having secondary particles having an average particle diameter of 150 nm and primary particles having an average particle diameter of 5 nm (produced by Saint-Gobain Ceramic Materials K.K.), serving as abrasive grains, into pure water containing 0.5 wt % of sodium oleate as a surfactant. The obtained slurry fluid includes 0.1 wt % of cluster diamond.

As a result of investigations, texturing conditions were set to the rotational speed of the disk substrate of 400 rpm, the thrusting pressure of the polishing tape of 1.5 kgf/cm$^2$ (0.15 MPa), the travel speed of the polishing tape of 35 mm/min, the oscillation of 5 Hz, the oscillation width of 1 mm, and the feed rate of the slurry fluid of 20 ml/min. Rolls made of nitrile rubber having a hardness of 50 duro were used as the pressing rolls. The time of the texturing process was 20 seconds per disk, where the two surfaces of the disk were textured simultaneously. Average surface roughness Ra of the surfaces of the obtained disk substrates with the texture traces was measured. The result is shown in Table 1.

The disk substrate with the texture traces produced as described above was heated until the substrate temperature reached about 220° C. Then, the disk substrate was placed in a sputtering apparatus with an Ar atmosphere set at a pressure of 5 mTorr (about 0.67 Pa). A Cr film having a thickness of 5.0 nm and a CrMo 20 (at %) film having a thickness of 2.0 nm were deposited on the disk substrate by the sputtering, to form an underlayer having a total thickness of 7.0 nm. Then, a stabilizing layer comprising a CoCr18Ta7 (at %) alloy film having a thickness of 4.0 nm was deposited. A Ru spacer layer having a thickness of 0.8 nm was deposited on the stabilizing layer. Then, a recording layer comprising a CoCr18Pt10B6 (at %) alloy film having a thickness of 15 nm was deposited. At the last, a carbon protective layer having a thickness of 3.5 nm was deposited and then the disk substrate was removed from the vacuum. Further, the protective layer was coated with a fluorine lubricant of perfluoropolyether, to form a 15.0-angstrom-thick lubricant layer thereon, thus obtaining a magnetic recording medium. An OR–Mr·t value of the magnetic recording medium was measured. The result is shown in Table 1.

Example 2

A polishing tape was produced by similar procedure to that of Example 1 except that multifilament comprised of polyethylene terephthalate (PET) having an average monofilament diameter of 500 nm which was obtained by changing the production conditions of the commingled yarn of Example 1 was used instead of the multifilament having an average monofilament diameter of 700 nm which has been obtained through the weight-loss with alkali in Example 1. The texturing was performed by similar procedure to that of Example 1 except that the above-described polishing tape was used, to produce a disk substrate. Average surface roughness Ra of the surfaces of thus obtained disk substrate was measured. A magnetic recording medium was produced by similar procedure to that of Example 1 except that the above-described disk substrate was used. An OR–Mr·t value of the magnetic recording medium was measured. These evaluation results are shown in Table 1.

Example 3

A polishing tape was produced by similar procedure to that of Example 1 except that multifilament comprised of polyethylene terephthalate (PET) having an average monofilament diameter of 950 nm which was obtained by changing the production conditions of the commingled yarn of Example 1 was used instead of the multifilament having an average monofilament diameter of 700 nm which has been obtained through the weight-loss with alkali in Example 1. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 1

A polishing tape was produced by similar procedure to that of Example 1 except that multifilament comprised of polyethylene terephthalate (PET) having an average monofilament diameter of 350 nm which was obtained by changing the production conditions of the commingled yarn of Example 1 was used instead of the multifilament having an average monofilament diameter of 700 nm which has been obtained through the weight-loss with alkali in Example 1. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 2

A polishing tape was produced by similar procedure to that of Example 1 except that multifilament comprised of polyethylene terephthalate (PET) having an average monofilament diameter of 1100 nm which was obtained by changing the production conditions of the commingled yarn of Example 1 was used instead of the multifilament having an average monofilament diameter of 700 nm which has been obtained through the weight-loss with alkali in Example 1. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Example 4

The polishing tape was produced by similar procedure to that of Example 1, except that buffing was not performed. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 3

The same polishing tape as that described in example 1 of Japanese Patent Application Laid-Open No. 2002-79472 was produced. Specifically, 50 wt % of nylon 6 (island component) and 50 wt % of polyethylene (sea component) were mixed together and spun into ultrafine fiber-generating island-sea fiber. The obtained island-sea fiber was drawn in water, mechanically crimped, and then chopped into fibers of 51 mm in length. These island-sea fibers were used to form fiber webs. The obtained fiber webs were laid on top of one another, needle punched, and then calendared to obtain non-woven fabric with a smooth surface Then, the sea part of the sea-island fiber is dissolved away. Then, the buffing was performed, thereby obtaining the buffed non-woven fabric (0.55 mm in thickness) composed from nylon 6 having an average monofilament diameter of 700 nm (0.004 dTex). The obtained buffed non-woven fabric was cut to obtain a polishing tape having a width of 4 cm. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 4

A buffed non-woven fabric (0.55 mm in thickness) composed from nylon 6 having an average monofilament diameter of 500 nm was obtained by similar procedure to that of Comparative Example 3 except for a change in the structure of the sea-island fiber. The obtained buffed non-woven fabric was cut to obtain a 4-cm wide polishing tape. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 5

A buffed non-woven fabric (0.55 mm in thickness) composed from nylon 6 having an average monofilament diameter of 900 nm was obtained by similar procedure to that of Comparative Example 3 except for a change in the structure of the sea-island fiber. The obtained buffed non-woven fabric was cut to obtain a 4-cm wide polishing tape. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 6

A buffed non-woven fabric (0.55 mm in thickness) composed from nylon 6 having an average monofilament diameter of 300 nm was obtained by similar procedure to that of Comparative Example 3 except for a change in the structure of the sea-island fiber. The obtained buffed non-woven fabric was cut to obtain a 4-cm wide polishing tape. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 7

A buffed non-woven fabric (0.55 mm in thickness) composed from nylon 6 having an average monofilament diameter of 1200 nm was obtained by similar procedure to that of Comparative Example 3 except for a change in the structure of the sea-island fiber. The obtained buffed non-woven fabric was cut to obtain a 4-cm wide polishing tape. The texturing was performed by similar procedure to that of Example 1 except that the above-described polishing tape was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 8

A slurry fluid was prepared by similar procedure to that of Example 1, except that polycrystalline diamond produced by an impact compression method and having an average secondary particle diameter of 120 μm was used as abrasive grains. The texturing was performed by similar procedure to that of Example 1 except that the above-described slurry was used, to produce a disk substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 9

A slurry fluid was prepared by similar procedure to that of Example 2, except that polycrystalline diamond produced by an impact compression method and having an average secondary particle diameter of 120 μm was used as abrasive grains. The texturing was performed by similar procedure to that of Example 2 except that the above-described slurry was used, to produce a disk substrate. Average surface roughness Ra of the surfaces of the obtained disk substrates was measured. A magnetic recording medium was produced by similar procedure to that of Example 2 except that the above-described disk substrate was used. An OR–Mr·t value of the magnetic recording medium was measured. These evaluation results are shown in Table 1.

Comparative Example 10

A slurry fluid was prepared by similar procedure to that of Example 3, except that polycrystalline diamond produced by an impact compression method and having an average secondary particle diameter of 120 μm was used as abrasive grains. The texturing was performed by similar procedure to that of Example 3 except that the above-described slurry was used, to produce a disk substrate. Average surface roughness Ra of the surfaces of the obtained disk substrates was measured. A magnetic recording medium was produced by similar procedure to that of Example 3 except that the above-described disk substrate was used. An OR–Mr·t value of the magnetic recording medium was measured. These evaluation results are shown in Table 1.

Comparative Example 11

A slurry fluid was prepared by similar procedure to that of Comparative Example 1, except that polycrystalline diamond produced by an impact compression method and having an average secondary particle diameter of 120 μm was used as abrasive grains. The texturing was performed by similar procedure to that of Comparative Example 1 except that the above-described slurry was used, to produce a disk substrate. Average surface roughness Ra of the surfaces of the obtained disk substrates was measured. A magnetic recording medium was produced by similar procedure to that of Comparative Example 1 except that the above-described disk substrate was used. An OR–Mr·t value of the magnetic recording medium was measured. These evaluation results are shown in Table 1.

Comparative Example 12

A slurry fluid was prepared by similar procedure to that of Comparative Example 2, except that polycrystalline diamond produced by an impact compression method and having an average secondary particle diameter of 120 μm was used as abrasive grains. The texturing was performed by similar procedure to that of Comparative Example 2 except that the above-described slurry was used, to produce a disk substrate. Average surface roughness Ra of the surfaces of the obtained disk substrates was measured. A magnetic recording medium was produced by similar procedure to that of Comparative Example 2 except that the above-described disk substrate was used. An OR–Mr·t value of the magnetic recording medium was measured. These evaluation results are shown in Table 1.

Comparative Example 13

A slurry fluid was prepared by similar procedure to that of Example 1, except that monocrystalline diamond produced by a static pressure compression method and having an average secondary particle diameter of 110 μm was used as abrasive grains. The texturing was performed by similar procedure to that of Example 1 except that the above-described slurry was used, to produce a disk-substrate. Average surface roughness Ra of the surfaces of the obtained disk substrates was measured. A magnetic recording medium was produced by similar procedure to that of Example 1 except that the above-described disk substrate was used. An OR–Mr·t value of the magnetic recording medium was measured. These evaluation results are shown in Table 1.

Comparative Example 14

A slurry fluid was prepared by similar procedure to that of Example 2, except that monocrystalline diamond produced by a static pressure compression method and having an average secondary particle diameter of 110 μm was used as abrasive grains. The texturing was performed by similar procedure to that of Example 2 except that the above-described slurry was used, to produce a disk substrate. Average surface roughness Ra of the surfaces of the obtained disk substrates was measured. A magnetic recording medium was produced by similar procedure to that of Example 2 except that the above-described disk substrate was used. An OR–Mr·t value of the magnetic recording medium was measured. These evaluation results are shown in Table 1.

Comparative Example 15

A slurry fluid was prepared by similar procedure to that of Example 3, except that monocrystalline diamond produced by a static pressure compression method and having an average secondary particle diameter of 110 μm was used as abrasive grains. The texturing was performed by similar procedure to that of Example 3 except that the above-described slurry was used, to produce a disk substrate. Average surface roughness Ra of the surfaces of the obtained disk substrates was measured. A magnetic recording medium was produced by similar procedure to that of Example 3 except that the above-described disk substrate was used. An OR–Mr·t value of the magnetic recording medium was measured. These evaluation results are shown in Table 1.

Comparative Example 16

A slurry fluid was prepared by similar procedure to that of Comparative Example 1, except that monocrystalline diamond produced by a static pressure compression method and having an average secondary particle diameter of 110 μm was used as abrasive grains. The texturing was performed by similar procedure to that of Comparative Example 1 except that the above-described slurry was used, to produce a disk substrate. Average surface roughness Ra of the surfaces of the obtained disk substrates was measured. A magnetic recording medium was produced by similar procedure to that of Comparative Example 1 except that the above-described disk substrate was used. An OR–Mr·t value of the magnetic recording medium was measured. These evaluation results are shown in Table 1.

Comparative Example 17

A slurry fluid was prepared by similar procedure to that of Comparative Example 2, except that monocrystalline diamond produced by a static pressure compression method and having an average secondary particle diameter of 110 μm was used as abrasive grains. The texturing was performed by similar procedure to that of Comparative Example 2 except that the above-described slurry was used, to produce a disk substrate. Average surface roughness Ra of the surfaces of the obtained disk substrates was measured. A magnetic recording medium was produced by similar procedure to that of Comparative Example 2 except that the above-described disk substrate was used. An OR−Mr·t value of the magnetic recording medium was measured. These evaluation results are shown in Table 1.

less than 2.0. As a result, the magnetic recording media exhibit unfavorable properties as compared with the media of Examples 1-4. For this reason, it is assumed that, when installed in HDD, the magnetic properties and the like of the magnetic recording medium will be poor.

Each of the magnetic recording media of Comparative Examples 3-7 also exhibit OR−Mr·t of less than 2.0. As a result, the magnetic recording media exhibit unfavorable properties as compared with the media of Examples 1-4. Comparative Examples 3-7 show that, by selecting thickness of the monofilament diameter, the surface roughness of the

TABLE 1

|  | Fiber composition | Average Monofilament diameter | Buffing | Abrasive grain | Substrate Average Surface Roughness Ra | OR-Mr · t |
|---|---|---|---|---|---|---|
| Ex. 1 | PET | 700 | Done | Cluster | 0.19 | 2.19 |
| Ex. 2 | PET | 500 | Done | Cluster | 0.16 | 2.12 |
| Ex. 3 | PET | 950 | Done | Cluster | 0.21 | 2.06 |
| Comp. Ex. 1 | PET | 350 | Done | Cluster | 0.09 | 1.85 |
| Comp. Ex. 2 | PET | 1100 | Done | Cluster | 0.18 | 1.93 |
| Ex. 4 | PET | 700 | Done | Cluster | 0.15 | 2.09 |
| Comp. Ex. 3 | Nylon 6 | 700 | None | Cluster | 0.14 | 1.65 |
| Comp. Ex. 4 | Nylon 6 | 500 | Done | Cluster | 0.12 | 1.55 |
| Comp. Ex. 5 | Nylon 6 | 900 | Done | Cluster | 0.18 | 1.73 |
| Comp. Ex. 6 | Nylon 6 | 300 | Done | Cluster | 0.05 | 1.42 |
| Comp. Ex. 7 | Nylon 6 | 1200 | Done | Cluster | 0.20 | 1.90 |
| Comp. Ex. 8 | PET | 700 | Done | Polycryst. | 0.32 | 1.69 |
| Comp. Ex. 9 | PET | 500 | Done | Polycryst. | 0.23 | 1.47 |
| Comp. Ex. 10 | PET | 950 | Done | Polycryst. | 0.35 | 1.58 |
| Comp. Ex. 11 | PET | 350 | Done | Polycryst. | 0.11 | 1.28 |
| Comp. Ex. 12 | PET | 1100 | Done | Polycryst. | 0.33 | 1.95 |
| Comp. Ex. 13 | PET | 700 | Done | Monocryst. | 0.29 | 1.97 |
| Comp. Ex. 14 | PET | 500 | Done | Monocryst. | 0.26 | 1.82 |
| Comp. Ex. 15 | PET | 950 | Done | Monocryst. | 0.31 | 2.13 |
| Comp. Ex. 16 | PET | 350 | Done | Monocryst. | 0.25 | 1.40 |
| Comp. Ex. 17 | PET | 1100 | Done | Monocryst. | 0.34 | 2.15 |

Figure 5:
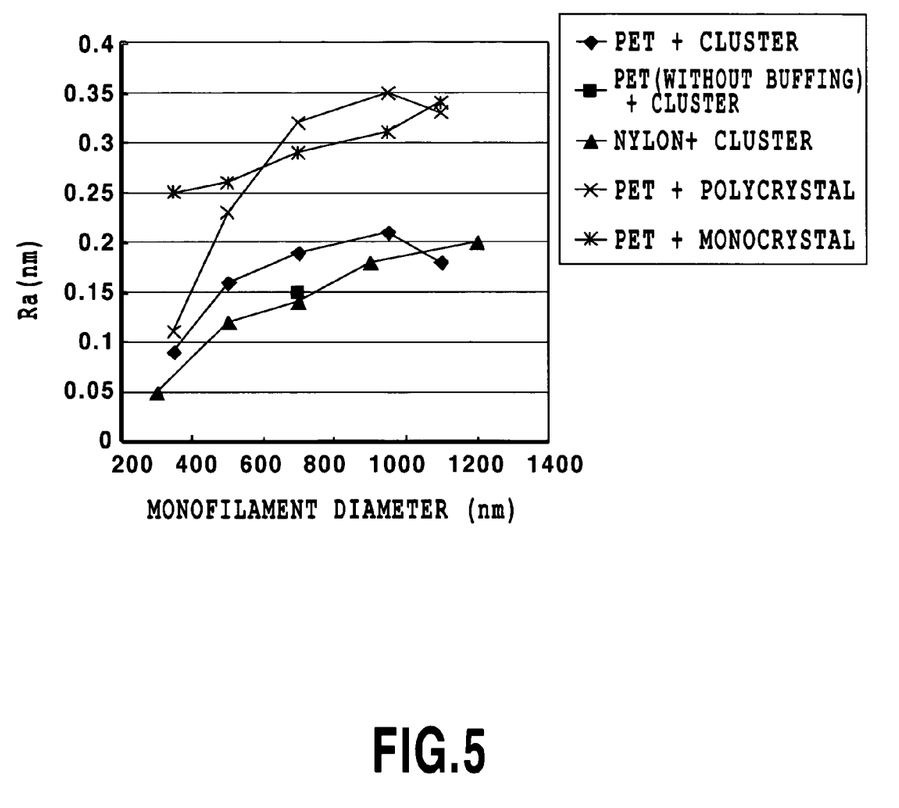
FIG. 5 is a graph showing the relationship between average surface roughness Ra of the surfaces of the disk substrates obtained in Examples 1 to 4 and Comparative Examples 1 to 17, and the single fiber diameter of an island-sea fiber based multifilament.
Figure 6:
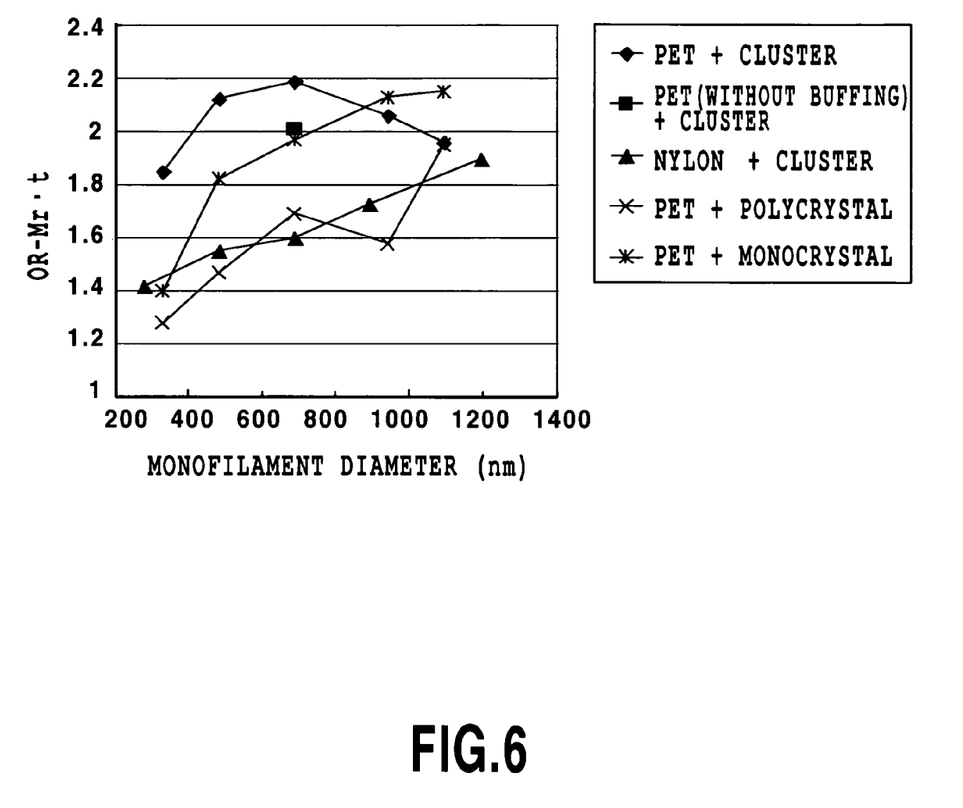
FIG. 6 is a graph showing the relationship between OR–Mr·t of the magnetic recording media obtained in Examples 1 to 4 and Comparative Examples 1 to 17, and the single fiber diameter of an island-sea fiber based multifilament.

FIG. 5 shows the relationship between the average surface roughness Ra of the surfaces of the disk substrates obtained in Examples 1 to 4 and Comparative Examples 1 to 17, and the monofilament diameter of the multifilament based on the sea-island fiber. FIG. 6 shows the relationship between the OR−Mr·t values of the magnetic recording media obtained in Examples 1 to 4 and Comparative Examples 1 to 17, and the monofilament diameter of the multifilament based on the sea-island fiber.

As clearly shown in Table 1, FIG. 5 and FIG. 6, the magnetic disks of Examples 1-4 exhibit an OR−Mr·t of 2.0 or more and enables to achieve a high recording density, in which the texturing was performed by use of (1) a polishing tape having the surface made of polyethylene terephthalate (PET) having a monofilament diameter of 400 nm or more and 950 nm or less and (2) abrasive grains including cluster diamond. In addition, the disk substrates of Examples 1-4 have a surface roughness Ra of 0.10 nm or more and 0.30 nm or less. Such surface roughness ensures a low floating height of the head, when the disk substrate is used in a magnetic disk, and thereby a high recording density can be achieved. It is also seen that the buffing is effective in increasing the value of OR−Mr·t.

In contrast, in the magnetic recording medium of Comparative Example 1 in which the monofilament diameter is 350 nm and the medium of Comparative Example 2 in which the monofilament diameter is 1100 nm, their OR−Mr·t are disk substrate can reach a satisfactory level, however it is impossible to increase OR−Mr·t to 2.0 or more.

The magnetic recording media of Comparative Examples 8-12, in which polycrystalline diamond was used as abrasive grains, generally exhibit a small OR−Mr·t. In particular, in the use of the polishing tape made from multifilaments with a large monofilament diameter, the surface roughness Ra becomes large. As a result, the magnetic recording media did not exhibit satisfactory properties.

In the magnetic recording media of Comparative Examples 13-17, in which monocrystalline diamond was used as abrasive grains, when the polishing tapes with the monofilament diameters 950 nm (Comp. Ex. 15) and 1100 nm (Comp. Ex. 17) were used, OR−Mr·t exceeded 2.0. However, the disk substrates of Comparative Examples 15 and 17 have a high surface roughness Ra of 0.3 nm or more. As compared with the cases of Embodiment examples, the properties are poor. It is assumed that, when the magnetic recording media are installed in HDDS, a problem associated with the floating of the head will arise.

As shown in the above, it can be seen that there is a local area exhibiting high OR−Mr·t depending on the monofilament diameter of the polyester fiber, in a region having relatively small surface roughness Ra of the disk substrate, when a polishing tape made from polyester fiber and cluster diamond serving as abrasive grains are used in combination in texturing the disk substrate. In particular, the polyester fiber favorably has a monofilament diameter of 400 nm or more and 950 nm or less, and more favorably, the polyester fiber has a monofilament diameter of 500 nm or more and 950 nm or more, providing the magnetic disk obtained having a surface roughness Ra of the disk substrate of 0.15 nm or more and 0.25 nm or less, and OR–Mr·t of 2.0 or more. As seen from Comparative Examples, this phenomenon is not observed in the cases employing a polishing tape made from other fiber or other diamond abrasive grains.

The foregoing Examples illustrate the case where the polyester fiber is fiber made from polyethylene terephthalate (PET), however the same advantageous effects were also achieved by polyester fiber other than PET, such as polytrimethylene terephthalate (PTT), polybutylene terephthalate (PBT), polylactic acid, or polyesters obtained by copolymerizing these components with a third component.

Commingled yarn made of polyester ultrafine fiber and multifilament made of ordinary polyethylene terephthalate (33 dtex/12 fil, fineness of monofilament 2.75 dtex, boiling water shrinkage 39.0%, produced by Teijin fiber corporation) was used in the foregoing Examples. However, commingled yarn, which is made from polyester ultrafine fiber and an ordinary multifilament such as nylon 6, nylon 66 or rayon can exhibit the same advantageous effects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for manufacturing a magnetic recording medium disk substrate, comprising a step of texturing a NiP surface of the substrate,
    the step of texturing the NiP surface is conducted by pressing a polishing tape by a pressing means against the NiP disk substrate surface rotated in a circumferential direction by a rotating means, while supplying a slurry containing abrasive grains, including cluster diamonds formed by bonding a plurality of primary single-crystal nano-diamond particles together in a dispersing medium, to the NiP surface of the disk substrate to form a texture in the NiP surface,
    wherein the polishing tape consists essentially of monofilament polyester fiber having a fiber diameter 400 nm or more and 950 nm or less, on at least a surface which contacts the NiP surface of disk substrate during the texturing, and
    wherein secondary particles of the cluster diamond have an average particle diameter of 50 nm or more and 300 nm or less.

2. A method for manufacturing the magnetic recording medium disk substrate according to claim 1, wherein the fiber diameter of the polyester fiber is 500 nm or more and 950 nm or less.

3. A method for manufacturing the magnetic recording medium disk substrate according to claim 1, wherein the polyester fiber is made from polyethylene terephthalate (PET).

4. A method for manufacturing the magnetic recording medium disk substrate according to claim 1, wherein at least the surface of the polishing tape which contacts with the disk substrate is subjected to buffing.

5. A method for manufacturing the magnetic recording medium disk substrate according to claim 1, wherein primary particles of the cluster diamond have an average particle diameter of 1 nm or more and 30 nm or less.

6. A method for manufacturing the magnetic recording medium disk substrate according to claim 1, wherein an electroless plated nickel-phosphorus film is formed on the surfaces of the magnetic recording medium disk substrate.

7. A method for manufacturing the magnetic recording medium disk substrate according to claim 6, wherein the magnetic recording medium disk substrate is made of aluminum.

8. A method for manufacturing the magnetic recording medium disk substrate according to claim 1, wherein the magnetic recording medium disk substrate is a disk substrate used for a longitudinal magnetic recording type magnetic recording medium.

9. A method for manufacturing a magnetic recording medium, comprising the step of:
    manufacturing a magnetic recording medium disk substrate according to the method of claim 1; and
    forming at least a magnetic layer onto the magnetic recording medium disk substrate.

\* \* \* \* \*